United States Patent
Dvir et al.

(10) Patent No.: US 12,008,815 B2
(45) Date of Patent: *Jun. 11, 2024

(54) CLOUD-BASED ANPR MANAGEMENT

(71) Applicant: Hi-Tech Solutions Ltd., Yokneam (IL)

(72) Inventors: Igal Dvir, Zichron Yaakov (IL); Yoram Hofman, Kefar Bialik (IL)

(73) Assignee: OMNIQ Corp., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,835

(22) Filed: Jun. 17, 2019

(65) Prior Publication Data

US 2020/0141175 A1    May 7, 2020

Related U.S. Application Data

(63) Continuation of application No. 15/299,405, filed on Oct. 20, 2016, now Pat. No. 10,323,450.

(60) Provisional application No. 62/244,124, filed on Oct. 20, 2015.

(51) Int. Cl.
| | |
|---|---|
| *G06V 20/54* | (2022.01) |
| *E05F 15/73* | (2015.01) |
| *G06V 10/94* | (2022.01) |
| *G06V 20/62* | (2022.01) |
| *H04L 67/10* | (2022.01) |

(52) U.S. Cl.
CPC .............. *G06V 20/54* (2022.01); *E05F 15/73* (2015.01); *G06V 10/95* (2022.01); *G06V 20/63* (2022.01); *E05F 2015/767* (2015.01); *E05Y 2600/11* (2013.01); *E05Y 2900/106* (2013.01); *E05Y 2900/132* (2013.01); *E05Y 2900/40* (2013.01); *G06V 20/625* (2022.01); *H04L 67/10* (2013.01)

(58) Field of Classification Search
None
See application file for complete search history.

(56) References Cited

U.S. PATENT DOCUMENTS

| | | | |
|---|---|---|---|
| 8,447,112 B2* | 5/2013 | Paul ........................ | G06F 18/00 382/105 |
| 10,323,450 B2* | 6/2019 | Dvir ........................ | G06V 20/63 |
| 2006/0017562 A1* | 1/2006 | Bachelder .............. | G08G 1/017 340/531 |
| 2013/0050492 A1* | 2/2013 | Lehning ................. | G06V 20/54 348/148 |
| 2014/0072170 A1* | 3/2014 | Zhang .................... | G06V 20/53 382/103 |

(Continued)

*Primary Examiner* — Tahmina N Ansari
(74) *Attorney, Agent, or Firm* — Bochner PLLC; Ariel Reinitz

(57) ABSTRACT

Systems and methods for cloud-based device management. In one implementation, a processing device receives one or more images captured in relation to a device, processes the one or more images to determine a presence of one or more identifiers within the one or more images, based on a determination that an identifier is present within the one or more images, processes the identifier in relation to an information repository to determine a permission status with respect to the identifier; identifies an instruction protocol associated with the device, generates an instruction corresponding to the permission status and the instruction protocol, and provides the instruction to the device.

20 Claims, 5 Drawing Sheets

(56) References Cited

U.S. PATENT DOCUMENTS

| | | | |
|---|---|---|---|
| 2014/0132758 A1* | 5/2014 | Saptharishi | G06T 15/08 |
| | | | 348/149 |
| 2015/0186228 A1* | 7/2015 | Kumar | G06F 9/5027 |
| | | | 714/4.12 |
| 2017/0011571 A1* | 1/2017 | Boles | G07C 9/30 |
| 2020/0167887 A1* | 5/2020 | Wang | G06F 9/3877 |

* cited by examiner

CLOUD-BASED ANPR MANAGEMENT

CROSS-REFERENCE TO RELATED APPLICATIONS

This application is a continuation of U.S. patent application Ser. No. 15/299,405, filed Oct. 20, 2016 (now U.S. Pat. No. 10,323,450) which is related to and claims the benefit of U.S. Patent Application No. 62/244,124, filed Oct. 20, 2015, each of which is incorporated herein by reference in its entirety.

TECHNICAL FIELD

Aspects and implementations of the present disclosure relate to data processing, and more specifically, to cloud-based device management.

BACKGROUND

Various devices, such as gates, doors, and/or other appliances can integrate communication interfaces. Through such interfaces, the devices can be controlled from remote locations.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In one aspect of the present disclosure, a processing device receives one or more images captured in relation to a device. The processing device processes the one or more images to determine a presence of one or more identifiers within the one or more images. Based on a determination that an identifier is present within the one or more images, the processing device processes the identifier in relation to an information repository to determine a permission status with respect to the identifier. The processing device identifies an instruction protocol associated with the device. The processing device generates an instruction corresponding to the permission status and the instruction protocol. The processing device provides the instruction to the device.

In another aspect of the present disclosure, a processing device receives a first input, the first input corresponding to a sensor trigger. In response to the first input, the processing device initiates capture of one or more images. The processing device transmits the one or more images to an identification service. The processing device receives, from the identification service, one or more instructions. The processing device initiates, based on the one or more instructions, one or more actions with respect to a device.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
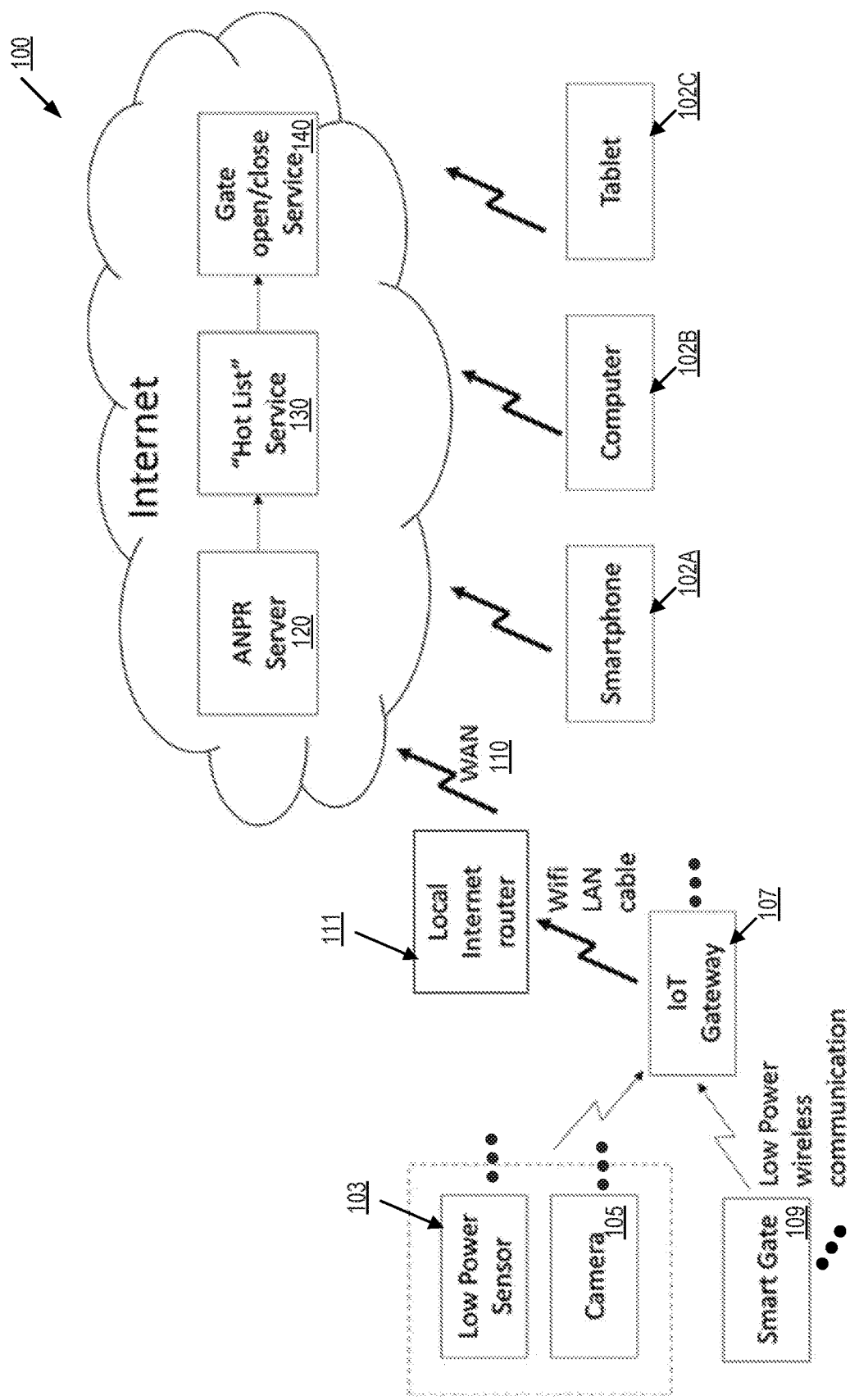
FIG. 1 depicts an illustrative system architecture, in accordance with one implementation of the present disclosure.

Aspects and implementations of the present disclosure are directed to the centralized management of gates, doors, and other such devices. In certain implementations, the described technologies may be implemented using cloud-based technologies (which, for example, may provide shared computing resources that may be accessed via network and/or other communication interfaces/protocols and which may be dynamically allocated, e.g., in response to demand, etc.). Additionally, in certain implementations the described technologies may utilize various image processing technologies, including but not limited to Automatic Plate Number Recognition (ANPR). For example, as described in detail herein, a centralized platform (such as may be implemented via cloud-based technologies) can enable one or more users to manage the operation of multiple gates, doors, etc. (such as those that may be positioned at the entrance(s) to various buildings, garages, properties, etc.) and/or any other devices that may be capable of being controlled remotely. The described systems and methods can, for example, enable users/administrators to identify vehicles that may (or may not) be approved for entry (e.g., through a particular gate), as well as additional rules/permissions corresponding to such vehicles (e.g., hours that the vehicle is/is not permitted to enter). Upon detecting that a vehicle has approached a particular gate, cameras image(s) of the vehicle/license plate can be captured and processed, e.g., using ANPR and/or other technologies. Upon determining that an approved vehicle/plate is present (e.g., when such a car approaches a garage door) an instruction can be generated and transmitted to the corresponding garage door/gate to open. In implementing such technologies across a cloud platform, relatively simple, low-cost, and/or power-efficient devices can be employed by the end-user (e.g., at the user's residence) while most or all of the processing operations can be employed in the 'cloud,' thereby resulting in significant efficiencies and advantages to the user. Additionally, additional gates, doors, cameras, etc., and/or other devices can be easily added to the system and can utilize the configuration(s) previously defined by the user/administrator.

Accordingly, it can be appreciated that the described technologies are directed to and address specific technical challenges and longstanding deficiencies in multiple technical areas, including but not limited to remote device administration, data processing, and centralized data management. As described in detail herein, the disclosed technologies provide specific, technical solutions to the referenced technical challenges and unmet needs in the referenced technical fields and provide numerous advantages and improvements upon conventional approaches.

Additionally, in various implementations one or more of the hardware elements, components, etc., (e.g., sensors, interfaces, etc.) operate to enable, improve, and/or enhance the described technologies, such as in a manner described herein.

FIG. 1 depicts an illustrative system architecture 100, in accordance with one implementation of the present disclosure. The system architecture 100 includes various devices, sensors, gateways, routers, and devices, as well as cloud-based services (which may be deployed within a single server/device or across multiple servers/devices). These various elements or components can be connected to one another (directly or indirectly) via network 110, which can be a public network (e.g., the Internet), a private network (e.g., a local area network (LAN) or wide area network (WAN)), or a combination thereof. It should also be noted that, as shown in FIG. 1, in certain implementations one or more of the described devices, components, and/or services may be implemented or deployed in 'the cloud.' For example, server 120 and/or services 130, 140 may be deployed within a cloud framework that enables the functions/operations of such components to be distributed to computing resources (processing resources, memory resources, storage resources, etc.) across one or more devices (e.g., across multiple servers). Such a cloud platform can enable the described technologies to dynamically increase the cloud resources being utilized (e.g., in a scenario in which there is a large increase in demand for processing or other computing resources) and/or decrease the resources being utilized (e.g., when demand decreases or is low). In doing so, the described technologies can be implemented in a manner that does not necessitate that a user maintain dedicated hardware (e.g., a standalone server, which is likely to have relatively limited resources) in order to implement the described technologies. Rather, as has been described, a cloud platform can efficiently provide nearly unlimited computing resources to enable the described operations and functionality, and the amount of cloud resources being utilized can be increased or decreased 'on demand' in order to enable efficient ongoing operation. Additionally, the referenced cloud platform can provide support (e.g., by way of the described technologies) to multiple cameras, sites, etc., such as those positioned or located in different geographic areas. In doing so, a user can deploy multiple cameras, etc., across multiple installations in different geographic locations, and monitor, manage, etc., events and activities occurring across such locations via a single unified interface (through which the referenced cloud platform can dynamically allocate resources to support the necessary operations) (e.g., as opposed to each site/installation having its own dedicated server, services, etc.).

As shown in FIG. 1, one or more sensor(s) 103, such as a passive infrared (PIR) sensor, ultrasonic sensor, and/or any other such sensors may be provided, e.g., at the location of a gate, door, entrance, etc., and/or any other such location to be monitored (or in proximity thereto). Such sensor(s) can, for example, detect an object (e.g., a vehicle, person, etc.) approaching a particular area or region. Moreover, in certain implementations, upon detecting the approach of such an object (e.g., by sensor(s) 103), the sensor(s) can initiate, trigger, and/or 'wake up' one or more camera(s) 105.

Camera 105 can be an imaging device, e.g., a still or video camera, 2D camera, 3D, camera, infrared camera, and/or any other such device capable of capturing images, video, etc., such as is described herein. Accordingly, for example, in certain implementations camera 105 can be configured to operate (e.g., at certain intervals, frequencies, etc.,) in a standby, sleep, and/or power-save mode. The camera can be activated or 'woken up' (e.g., in order to capture images) in response to an instruction/trigger from sensor 103 (e.g., in response to a trigger indicating that an object has entered a certain area).

In certain implementations, sensor(s) 103 and/or camera(s) 105 can also be configured to communicate with and/or via one or more gateway(s) 107, such as an Internet of Things ('IoT') gateway. In certain implementations, sensor(s) 103 and/or camera(s) 105 may transmit and/or receive notifications, instructions, images, etc., via a low power and/or low bandwidth network/protocol such as ZigBee, ZeeWave, Thread, Bluetooth DECT and/or other protocol(s). For example, IoT gateway 107 can be configured to enable transmission of the referenced images, triggers, etc. (e.g., as received from a low power wireless network) to a central server 120 such as an ANPR cloud server (e.g., through the Internet).

It should be further understood that camera(s) 105 (which may be associated with a specific user/administrator) may be installed in any number of locations/positions. For example, such a camera can be installed next to a gate or garage door such that the field of view of the camera covers some or all of the garage/gate driveway. Once the presence of a vehicle is detected, such as through a built in trigger in the camera (e.g., an image processor or module capable of detecting the entry of objects, etc., within the field of view of the camera) or external trigger such as sensor 103 (e.g., via one or more presence/location-detection techniques), the camera can be activated/instructed to capture one or more images of the object/vehicle and/or its license plate or any other such identifying areas, regions, items, elements, etc. As described in detail herein, the captured images can be transmitted (e.g., via the internet) to a cloud based server 120. The server can then process and/or recognize the vehicle's license plate number and/or any number of other identifying factors. Upon determining that the vehicle/license plate number is present in an approved ('open gate') hot-list, a command to open the gate can be generated and/or transmitted to the gate (e.g., by services 130 and/or 140, such as is described herein). In certain implementations, gate 109 can be connected to the Internet (or any other such network) through an IoT (Internet of Things) interface/device 107, such as is described herein. It should also be noted that, as described herein, in certain implementations, the ANPR cloud server 120 and/or services 130, 140 can be configured to communicate with a cloud-based server associated with the gate in order to open and close the gate 109 (and/or initiate one or more other actions).

It should be noted that, as noted above, in certain implementations, various camera(s) 105 may incorporate various local image processing (e.g., ANPR) capabilities (e.g., cameras that may include/incorporate a local ANPR processor). In certain implementations, such a local processor may be configured to initially process a captured image (e.g., to determine whether a frequently recognized vehicle is present). Subsequently (e.g., in a scenario in which the identifier in the captured image—e.g., a license plate—cannot be authenticated by the local processor), the captured image(s) can be transmitted to a centralized ANPR server 120 in the cloud which may be configured to serve multiple cameras (e.g., those connected through the internet), such as is described herein. Various dynamically allocated processing techniques, which may employ load balancing, can be used in order to implement one or more ANPR algorithm(s), such as in order to accommodate changing data traffic. Various results of the referenced ANPR recognition can be transmitted and/or otherwise processed in conjunction with the referenced 'hot list' service 130, such as in order to make further determinations.

By way of further illustration, in certain implementations, camera 105 may be installed, configured, and/or otherwise positioned by a user/administrator, e.g. at (or in proximity to) a location that the user wishes to monitor (e.g., opposite a door, gate, entrance, traffic lane or path, etc.). The described technologies may include an application (e.g., application 292 which may execute on device 102) through which camera 105 may be configured with respect to server 120, services 130, 140, and/or one or more of the other devices described herein. For example, device 102 may be connected to and/or otherwise communicate with camera 105 (e.g., via one or more communication interfaces, e.g., Bluetooth, Wifi, etc.). Application 292 executing on device 102 may be associated with an account (e.g., an account corresponding to the user of the device). Such an account can include various parameters, protocols, settings, etc., which reflect the manner in which images captured by the camera are to be processed (e.g., by server 120, services 130, 140, etc.), such as in a manner described herein. Additionally, in certain implementations various events that are captured by the camera (e.g., the approach of a vehicle to the entrance, etc.) and/or detected by server 120 and/or services 130, 140 can be tracked over time (e.g., stored in a repository associated with the referenced user account). In doing so, for example, reports, statistics, and/or other items or information may be generated which reflect those vehicles that have approached, entered, etc., one or more doors/gates associated with/monitored by the user (as well as the dates, times, etc., associated with such events). In certain implementations, traffic patterns and/or other such trends can be tracked (e.g., with respect to a particular camera or cameras). For example, traffic/access patterns can be tracked with respect to a particular camera, reflecting when the flow of vehicles (and/or certain specific vehicles or types of vehicles) into/out of a gate, door, entrances, etc., increases or decreases. In certain implementations, various alerts, notifications, and/or configuration parameters can be defined with respect to such trends. For example, a notification/alert can be generated when there is a dramatic increase in the number of vehicles entering a particular gate (e.g., at a time at which the gate has not been historically busy). By way of further example, a configuration parameter can be employed whereby in a scenario in which a significant number of vehicles can be determined to have entered a gate/door, etc., when subsequent vehicles attempt to access the gate, the permission status of such vehicles can be overridden (e.g., with respect to vehicles that would otherwise be approved for entry) on account of the likelihood of congestion (due to the recent influx of many vehicles). Moreover, in certain implementations application 292 executing on device 102 may enable the user to define various access control rules, e.g., to permit/prohibit certain license plates, apply various rules on different dates/times, etc.

Additionally, by connecting/configuring camera 105 with server 120 and/or services 130, 140, one or more recognition/processing parameters/settings can be defined or determined with respect to the camera (e.g., in an automated fashion). That is, it can be appreciated that, for example, different cameras positioned at different locations (e.g., in different states/countries) may be likely to capture images of license plates (and/or other such identifiers) that have different characteristics (e.g., different shapes, colors, having different syntaxes, etc.). Accordingly, in configuring camera 105 with server 120 and/or services 130, 140, one or more processing parameters can be defined which reflect the manner in which image(s) captured by the camera are to be processed by server 120 and/or services 130, 140. For example, upon determining that a newly installed camera is present in a particular state/country (e.g., based on inputs received from a GPS receiver integrated within the camera and/or from inputs received from a GPS receiver integrated within a device 102 that is being used to configure the camera), one or more processing parameters can be defined which reflect that the license plates that are present in the images captured by the camera are likely to be of a particular color, have a particular design, etc. Such processing parameters can further dictate how the captured images are to be processed in order to achieve an accurate and/or efficient result. For example, for a camera determined to be present in a particular state/country in which the license plates have a certain background and/or text color, processing parameters can be generated (and employed/applied) which reflect that server 120 and/or services 130, 140 should adjust various aspects of the contrast, brightness, etc. of the image before determining the identifier, e.g., in order to increase the accuracy and/or decrease the computing resources that may be needed.

By way of yet further example, the referenced processing parameters can be defined based on the determined positioning of the camera, e.g., with respect to the field of view of the camera. That is, it can be appreciated that a newly installed camera may be positioned in a manner that provides a relatively large field of view, though certain aspects of the described processing may only be relevant to a relatively small segment of the entire captured image (e.g., the segment containing the license plate). Accordingly, upon connecting/configuring a new camera, the described technologies can be utilized to process image(s) captured by the camera, and to determine what region(s) of the referenced image are likely to contain the identifier, etc. Upon determining, for example, that a particular region of the captured image(s) is likely to contain the identifier, the processing of such an area (e.g., in subsequent images) can be prioritized. In doing so, previously captured images can be utilized to focus, improve and/or enhance the processing of subsequent images. It should also be noted that the referenced processing parameters may also include image capture parameters (e.g., settings which reflect/instruct camera 105 how to capture image(s), such as in order to improve the quality of the images captured and/or the accuracy of the identifications).

As noted above, in certain implementations, one or more gate(s) 109 (and/or any other such connected devices) may also be connected to and/or configured in relation to gateway(s) 107. For example, a 'smart' gate or garage door may be installed or otherwise configured at the entrance to a building, garage, property, etc. In addition to the various components of a mechanical gate (e.g., door(s), hinge or other opening mechanism, locking mechanism, etc.), such a 'smart' gate can include a motor (and related mechanisms) that can enable the opening and/or closing of the gate, as well as communication interfaces, circuitry, etc., through which the gate can be connected to gateway 107, etc., and through which the gate can transmit/receive information and/or instructions, e.g., commands to open, close, etc. the gate, as described herein.

It should be noted that referenced gate/garage door 109 (and/or any other such connected device, e.g., a light switch, air conditioning/heating system, entertainment system, etc.) can be connected to the Internet through various switches and/or controllers, such as a smart open/close switch (which may, for example, be connected to the Internet via a local Wifi network). The referenced switch cloud service can be configured to communicate and/or receive instructions from the referenced 'hot list' cloud service 130, and thereby enable opening and closing the gate/garage door and/or other actions, as described herein.

As further shown in FIG. 1, in certain implementations gateway 107 can be further connected to a local network connection/router 111, e.g., via Wifi, LAN cable, and/or any other such communication interface. Router 111 can, in turn, enable the referenced device(s) to connect (e.g., via WAN 110, such as the Internet) to the various server(s) 120 and/or services 130, 140, described herein.

Server 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Moreover, in certain implementations server 120 (and/or its functionality) may be deployed or implemented within a cloud framework that enables the functions/operations of server 120 to be distributed 'on demand' to computing resources across one or more devices (e.g., across multiple servers), such as is described above. Additionally, server 120 can be further configured with respect to various devices that provide certain services, such as a 'hot list' service 130 and/or a gate open/close service 140. Such service(s) 130, 140 (and/or their respective functionalities) may also be deployed or implemented within a cloud framework, such as is described above. It should be understood that, in certain implementations, server 120 can also include and/or incorporate various sensors and/or communications interfaces (including but not limited to those depicted in FIG. 2 and described below in relation to device 102). The described components can be combined together or separated in further components, according to a particular implementation. It should be noted that in some implementations, various components of server machine 120 and/or services 130, 140 may run on separate machines. Moreover, some operations of certain of the components are described in more detail herein.

In certain implementations, ANPR server 120 can receive image(s), video, etc., captured via camera(s) 105, such as in a manner described herein. Server 120 can then process the referenced image(s) (e.g., via an ANPR application/engine executing on the server 120), e.g., using one or more Optical Character Recognition (OCR) techniques. In doing so, one or more alphanumeric characters and/or other such identifiers can be determined to be present within the captured image(s). For example, image(s) of a vehicle approaching/stopped at a gate, door, etc., can be processed to determine the license plate number associated with the vehicle.

Additionally, in certain implementations, upon identifying (e.g., by server 120) the identifier (e.g., license plate number) associated with the referenced vehicle, such an identifier can be further processed by/in relation to 'hot list' service 130. Such a service can, for example, manage a database of identifiers with respect to which various permissions may be defined. For example, such a 'hot list' may reflect that certain license plates may be permitted entry through all gates at all times, other license plates permitted entry only through certain gates at certain times, other license plates never permitted entry, etc. Accordingly, upon receiving an identified license plate number (e.g., from server 120), 'hot list' service 130 can process the referenced identifier (e.g., in relation to database(s) of approved/permitted vehicles and/or rules associated with such vehicles) to demine whether or not the referenced vehicle is permitted to enter the gate to which it has approached and/or whether one or more other actions should be initiated (e.g., providing an alert/notification, such as in the event of the arrival of a vehicle that is not permitted to enter, the arrival of a vehicle of a VIP, etc.). Upon determining (e.g., by service 130) that the vehicle is permitted to enter (e.g., via the gate at which it has approached at the current time), a notification can be provided to gate open/close service 140. Such a notification can indicate, for example, that the referenced gate 109 should be opened. Service 140 can then generate a 'gate open' notification, instruction, etc., which can be transmitted to gate 109. For example, service 140 can maintain a repository of protocols, etc., that may be associated with different types of gates, doors, and/or other devices. Accordingly, upon determining that the gate should be opened for a particular vehicle, service 140 can determine the proper protocol to use and generate/provide a corresponding instruction/notification, reflecting that the gate 109 should open.

It should be understood that though FIG. 1 depicts server 120 and services 130, 140 (that is, the devices implementing such services, e.g., devices, servers, etc.) as being discrete components, in various implementations any number of such components (and/or elements/functions thereof) can be combined, such as within a single component/system.

For example, in certain implementations service 130 (e.g., a device or server implementing the service) can include a data repository hosted by one or more storage devices, such as main memory, magnetic or optical storage based disks, tapes or hard drives, NAS, SAN, and so forth. In some implementations, such a repository can be a network-attached file server, while in other implementations the repository can be some other type of persistent storage such as an object-oriented database, a relational database, and so forth, that may be hosted by the server 120 or one or more different machines coupled to the server machine 120, while in yet other implementations the repository may be a database that is hosted by another entity and made accessible to server 120 and/or service 130. As noted, the repository can store data pertaining to the various license plates, vehicles, administrators, gates, rules, etc., that are handled/managed by the described technologies. For example, in certain implementations, a repository can store approved license plates, track gate access histories, e.g., with respect to a particular gate, vehicle, building, etc.

As also shown in FIG. 1, various devices 102A-C may be connected to and/or otherwise communicate with server 120 and/or services 130, 140. Device(s) 102 can be, for example, a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. In certain implementations, device 102 can enable a user/administrator to provide/update approved license plates and/or rules to server 120 and/or services 130, 140, receive and/or review notifications/alerts, and/or to configure various other aspects of the operation of the described technologies. Device 102 may run an operating system (OS) that manages hardware and software of the device 102. Various applications, such as mobile applications ('apps'), web browsers, etc. (not shown) may run on the device (e.g., on the OS of the device).

Figure 2:
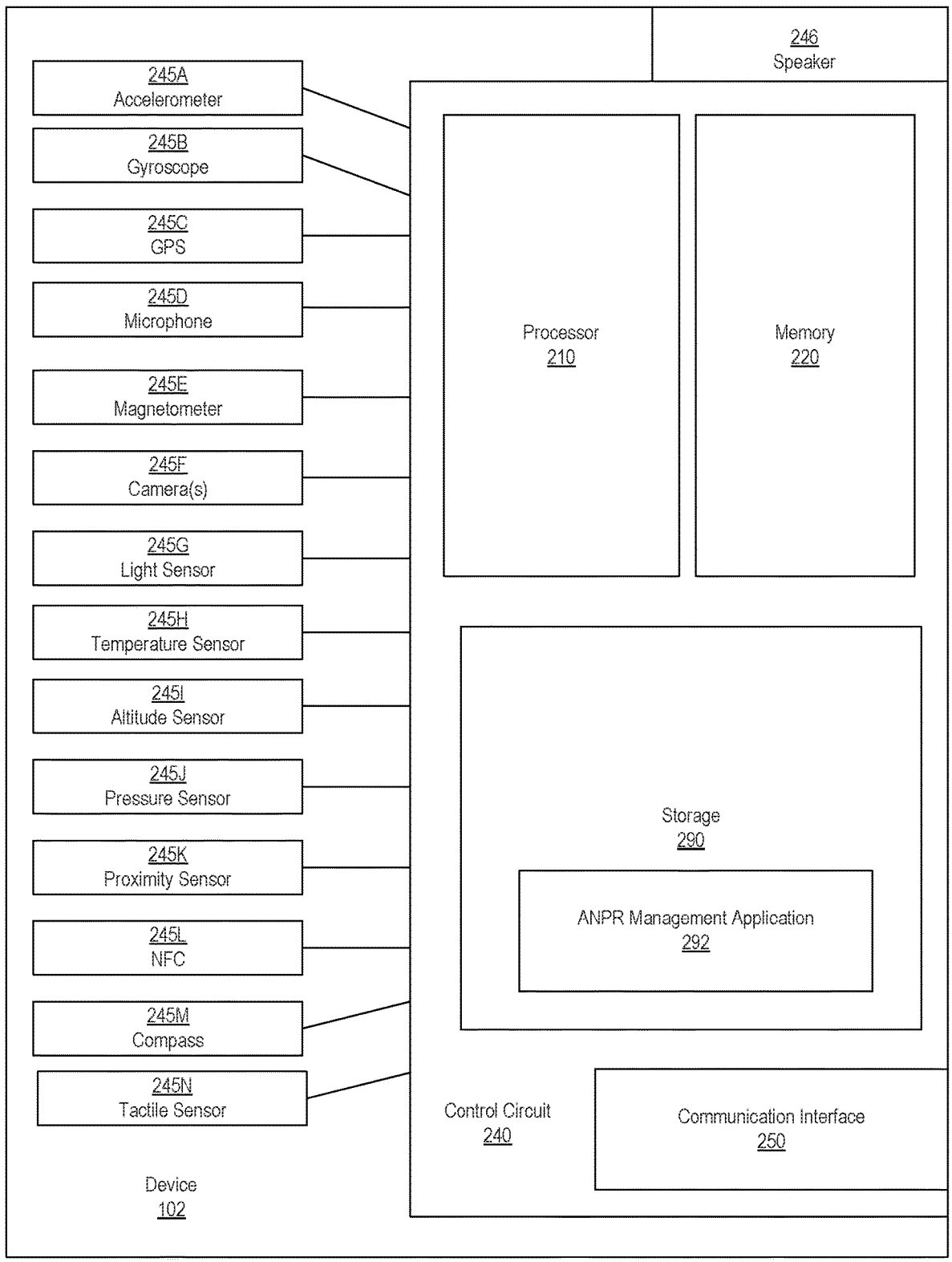
FIG. 2 depicts an exemplary implementation of a device in accordance with aspects and implementations of the present disclosure.
Figure 5:
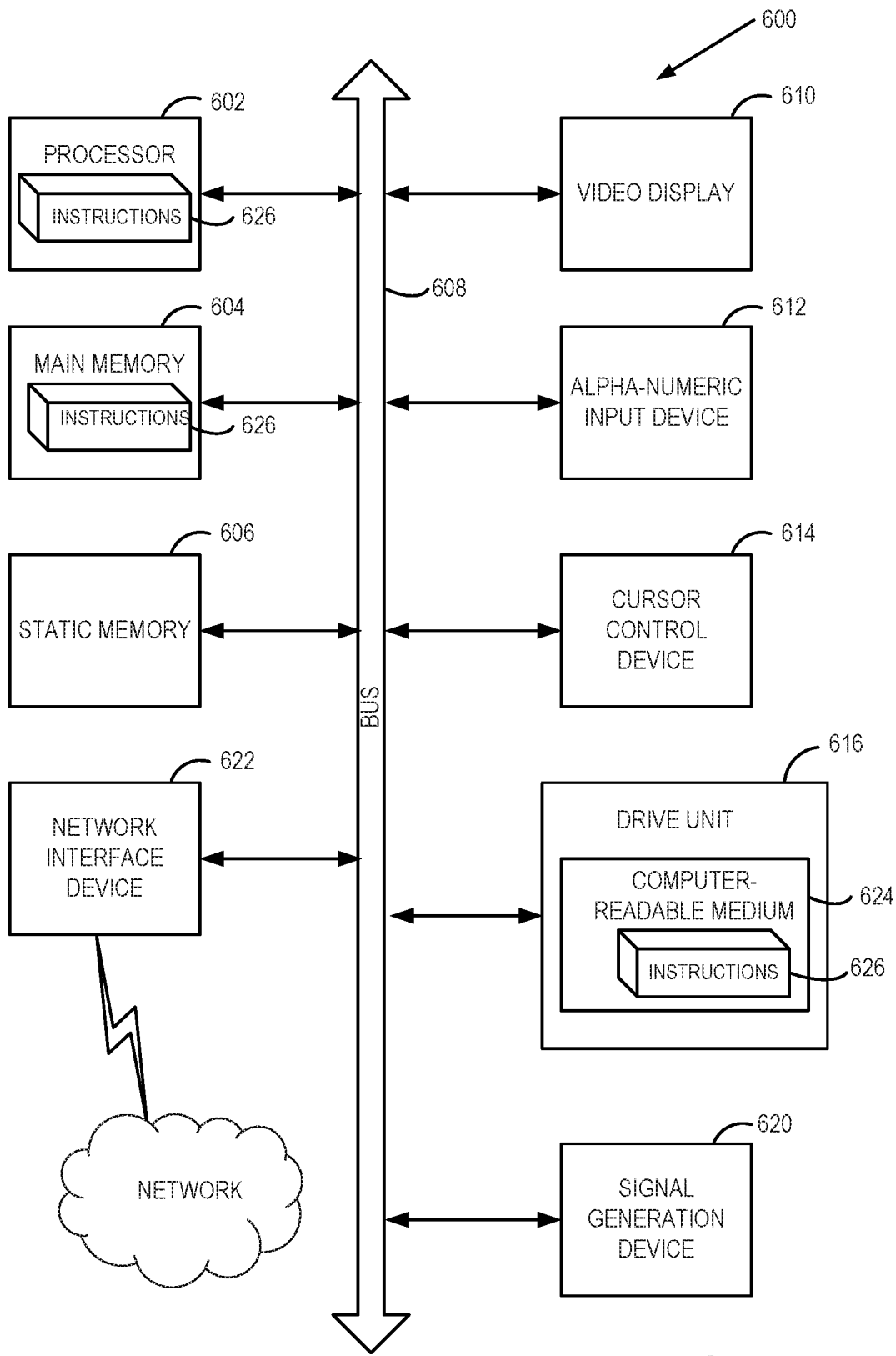
FIG. 5 depicts a block diagram of an illustrative computer system operating in accordance with aspects and implementations of the present disclosure.

It should be understood that, in certain implementations, device 102 can also include and/or incorporate various sensors and/or communications interfaces (including but not limited to those depicted in FIGS. 2 and 5 and/or described/ referenced herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc. Additionally, in certain implementations user device can be connected to and/or otherwise communicate with various peripheral devices.

As noted, in certain implementations, device(s) 102 can also include and/or incorporate various sensors and/or communications interfaces. By way of illustration, FIG. 2 depicts one exemplary implementation of device 102. As shown in FIG. 2, device 102 can include a control circuit 240 (e.g., a motherboard) which is operatively connected to various hardware and/or software components that serve to enable various operations, such as those described herein. Control circuit 240 can be operatively connected to processor 210 and memory 220. Processor 210 serves to execute instructions for software that can be loaded into memory 220. Processor 210 can be a number of processors, a multi-processor core, or some other type of processor, depending on the particular implementation. Further, processor 210 can be implemented using a number of heterogeneous processor systems in which a main processor is present with secondary processors on a single chip. As another illustrative example, processor 210 can be a symmetric multi-processor system containing multiple processors of the same type.

Memory 220 and/or storage 290 may be accessible by processor 210, thereby enabling processor 210 to receive and execute instructions stored on memory 220 and/or on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above. Storage 290 also can be fixed or removable.

As shown in FIG. 2, storage 290 can store ANPR management application 292. In certain implementations, ANPR management application 292 can be, for example, instructions, an 'app,' etc., that can be loaded into memory 220 and/or executed by processing device 210, in order to enable a user of the device to interact with and/or otherwise utilize the technologies described herein (e.g., in conjunction with/ communication with server 120).

A communication interface 250 is also operatively connected to control circuit 240. Communication interface 250 can be any interface (or multiple interfaces) that enables communication between user device 102 and one or more external devices, machines, services, systems, and/or elements (including but not limited to those depicted in FIG. 1 and described herein). Communication interface 250 can include (but is not limited to) a modem, a Network Interface Card (NIC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 102 to other computing devices, systems, services, and/or communication networks such as the Internet. Such connections can include a wired connection or a wireless connection (e.g. 802.11) though it should be understood that communication interface 250 can be practically any interface that enables communication to/from the control circuit 240 and/or the various components described herein.

At various points during the operation of described technologies, device 102 can communicate with one or more other devices, systems, services, servers, etc., such as those depicted in FIG. 1 and/or described herein. Such devices, systems, services, servers, etc., can transmit and/or receive data to/from the user device 102, thereby enhancing the operation of the described technologies, such as is described in detail herein. It should be understood that the referenced devices, systems, services, servers, etc., can be in direct communication with user device 102, indirect communication with user device 102, constant/ongoing communication with user device 102, periodic communication with user device 102, and/or can be communicatively coordinated with user device 102, as described herein.

Also connected to and/or in communication with control circuit 240 of user device 102 are one or more sensors 245A-245N (collectively, sensors 245). Sensors 245 can be various components, devices, and/or receivers that can be incorporated/integrated within and/or in communication with user device 102. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 102 can perceive/receive various inputs from sensors 245 and such inputs can be used to initiate, enable, and/or enhance various operations and/or aspects thereof, such as is described herein.

At this juncture it should be noted that while the foregoing description (e.g., with respect to sensors 245) has been directed to user device 102, various other devices, systems, servers, services, etc. (such as are depicted in FIG. 1 and/or described herein) can similarly incorporate the components, elements, and/or capabilities described with respect to device 102. For example, sensor(s) 103, camera(s), 104, gateways 107, gate(s) 109, server(s) 120, service(s) 130, 140, etc. may also incorporate one or more of the referenced components, elements, and/or capabilities. It should also be understood that certain aspects and implementations of various devices, systems, servers, services, etc., such as those depicted in FIG. 1 and/or described herein, are also described in greater detail below in relation to FIG. 5.

By way of further illustration, a user can utilize device 102 to login to application 292. Having identified him/ herself (e.g., as an administrator with privileges to control various aspects of the operations described herein, the user can define and review his 'hot list,' which may be the list of vehicles/license plates upon detection of which (e.g., upon identification, using the referenced ANPR techniques, of a license plate associated with the referenced vehicle) a particular gate will open (and/or another action will be initiated/ another instruction will be provided). The user can also define a list of vehicles upon identification of which the user will be provided with an alert (e.g., via SMS, notification, email, and/or any other means of communication).

Moreover, the described technologies can be configured to communicate with various users through the users' respective user devices 102A-C and/or client applications (e.g., on a smartphone, web browser, computer, etc.). Each user can independently define which vehicles will open the gate(s) that the user controls, will generate an alert, or both. Once a user's camera sends images determined to have a valid plate number, the recognized number can be compared to that user's "hot list" and "open gate" command, alerts, and/or both can be generated and/or transmitted, as appropriate.

The described technologies can also collect information, statistics, etc. (e.g., with respect to the operation of the referenced gate, etc.) such as in order to improve real-time and/or future operations of the described technologies. For example, in certain implementations, determinations/identifications associated with one camera/gate can be utilized and/or accounted for with respect to another camera/gate. For example, in a scenario in which an approved license plate has been determined to recently have entered one gate, upon determining (e.g., within a close chronological interval) that the same license plate is attempting to enter another gate (e.g., a gate that is a significant distance away from the first gate, such that the vehicle could not have reasonably traveled from one area to the other within the time interval), an alert/notification can be generated, and/or an instruction not to open the gate can be generated/provided (on account of the fact that the license plate may be a forgery and/or is being used fraudulently).

Figure 3:
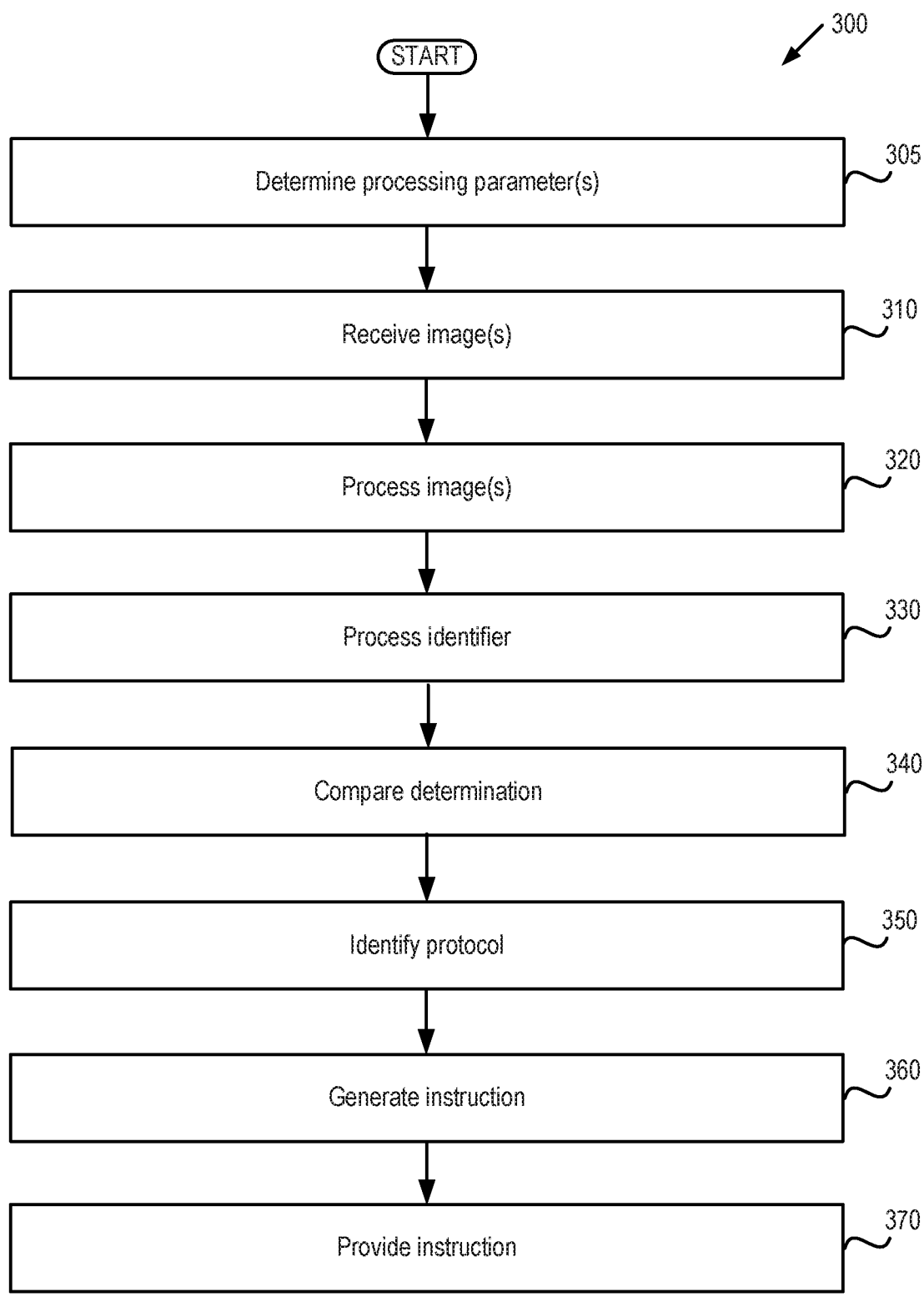
FIG. 3 depicts a flow diagram of aspects of a method for cloud-based device management in accordance with one implementation of the present disclosure.

In certain implementations various aspects of the described technologies can be implemented as methods for cloud-based ANPR management. For example, FIG. 3 depicts a flow diagram of a method 300 for cloud-based ANPR management. The method is performed by processing logic that may comprise hardware (circuitry, dedicated logic, etc.), software (such as is run on a computer system or a dedicated machine or special purpose machine), or a combination of both. In one implementation, the method is performed by one or more elements depicted and/or described in relation to FIGS. 1 and 2, while in some other implementations, one or more blocks of FIG. 3 may be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 305, one or more processing parameters, recognition settings, etc., can be determined, such as in a manner described herein. In certain implementations, such processing parameters may be determined based on one or more images previously captured in relation to a device (e.g., previously captured images by a camera). For example, upon determining that a particular camera is positioned at a particular location, at a particular angle/vantage point, etc., various processing parameters (and/or image capture or recognition parameters/settings) can be determined. Such parameters/settings can reflect how subsequent images are to be processed, e.g., in order to efficiently and accurately identify a license plate, other identifier, etc. It should be understood that, in certain implementations, various aspects of block 305 can be performed by server 120, services 130, 140, and/or devices 102, while in other implementations such aspects may be performed by one or more other elements/components, such as those described herein.

At block 310, one or more images can be received. In certain implementations, such image(s) may be captured in relation to a device. Such a device can include, but is not limited to, a gate, a door (e.g., a garage door), an appliance, and/or any other such device capable of receiving instructions such as are described herein. Moreover, in certain implementations such image(s) are captured in response to receipt of a sensor trigger. Such a trigger can be, for example, one or more inputs generated by and/or received from a sensor (e.g., a motion sensor, etc.), such as those described and/or referenced herein. It should be understood that, in certain implementations, various aspects of block 310 can be performed by server 120, services 130, 140, and/or devices 102, while in other implementations such aspects may be performed by one or more other elements/components, such as those described herein.

At block 320, image(s) (such as those received/captured at 310) can be processed. In doing so, a presence of one or more identifiers (e.g., license plate numbers, other identifying characteristics, etc.) can be determined, e.g., within the one or more images, such as in a manner described herein. Additionally, in certain implementations the one or more images can be processed using optical character recognition (OCR) and/or other image processing techniques to determine a presence of one or more identifiers within the one or more images, such as in a manner described herein. Moreover, in certain implementations, the referenced image(s) can be processed based on various processing parameters, recognition settings, etc., such as may be determined at 305 and described herein. Additionally, in certain implementations the images(s) can be processed based on identifier(s) stored in an information repository (as maintained/managed, for example, by 'hot list' service 130). For example, in a scenario in which a relatively small number of license plates are approved for entry, images of approaching vehicles can be processed initially to determine whether the associated license plate is likely to be present in the 'approved' list (e.g., is the license plate the same color as one of those on the approved list, does it begin with the same character as one of those on the approved list, etc.). In doing so, those plates/vehicles that are not approved can be identified efficiently/quickly (e.g., without dedicating further processing resources to a vehicle/plate that is not approved). It should be understood that, in certain implementations, various aspects of block 320 can be performed by server 120, services 130, 140, and/or devices 102, while in other implementations such aspects may be performed by one or more other elements/components, such as those described herein.

Moreover, in certain implementations one or more computing resources (e.g., processing resources, memory resources, storage resources, etc.) can be allocated to the described processing (e.g., of the captured image(s), etc.), such as within a cloud platform as is described herein. Additionally, in certain implementations the processing of the referenced images may be distributed across multiple sets of computing resources, such as those that may originate from multiple machines (devices, servers, etc.), such as within a cloud platform as is described herein. By way of illustration, one set of computing resources from a first machine (device, server, etc.) may process the captured image(s) in one way (e.g., a first aspect of the processing of the images, e.g., to identify the location of the license plate within the image), while another set of computing resources (e.g., from a second machine) may process the captured image(s) in another way (e.g., a second aspect of the processing of the images, e.g., to identify the characters, identifiers, etc., within the license plate).

Additionally, in certain implementations the processing of the one or more images can be redistributed. For example, the described technologies (e.g., as implemented over a cloud platform) can redistribute the processing of the referenced image(s) from one set of computing resources (e.g., resources from a first machine, e.g., a server, device, etc.) to a second set of computing resources from a second machine. Additionally, in certain implementations such redistribution of the processing can be initiated or triggered in response to receipt of one or more additional processing requests. For example, while a first set of resources from the cloud platform is processing a first set of images (e.g., as received form a first camera), in a scenario in which image(s) from one or more other cameras are received for processing, in certain implementations one or more of the processing instances (including those that may be queued and/or underway with respect to a first set of resources) can be redistributed to another set of computing resources (e.g., those of another machine). In doing so, load balancing can be achieved by enabling multiple sets of processing resources within the cloud platform to perform the various processing instances in parallel.

Additionally, in certain implementations one or more events, trends, histories, and/or other occurrences (including but not limited to those associated with the one or more images) can be tracked, monitored, etc. By way of illustration, in certain implementations various events that are captured by the camera (e.g., the approach of a vehicle to the entrance, etc.) and/or detected by server 120 and/or services 130, 140 can be tracked over time (e.g., stored in a repository associated with the referenced user account). In doing so, for example, reports, statistics, and/or other items or information may be generated which reflect those vehicles that have approached, entered, etc., one or more doors/gates associated with/monitored by the user (as well as the dates, times, etc., associated with such events). Additionally, in certain implementations, traffic patterns and/or other such trends can be tracked (e.g., with respect to a particular camera or cameras). For example, traffic/access patterns can be tracked with respect to a particular camera, reflecting when the flow of vehicles (and/or certain specific vehicles or types of vehicles) into/out of a gate, door, entrances, etc., increases or decreases. In certain implementations, various alerts, notifications, and/or configuration parameters can be defined with respect to such trends. For example, a notification/alert can be generated when there is a dramatic increase in the number of vehicles entering a particular gate (e.g., at a time at which the gate has not been historically busy). By way of further example, a configuration parameter can be employed whereby in a scenario in which a significant number of vehicles can be determined to have entered a gate/door, etc., when subsequent vehicles that attempt to access the gate, the permission status of such vehicles can be overridden (e.g., with respect to vehicles that would otherwise be approved for entry) on account of the likelihood of congestion (due to the recent influx of many vehicles).

At block 330, based on a determination (e.g., at 320) that an identifier is present within the one or more images, the identifier can be processed. In certain implementations, such an identifier (e.g., license plate number, other identifying characteristics, etc.) can be processed in relation to an information repository (e.g., a database, list, etc., such as may be maintained by one or more services 130, 140). In doing so, a permission status (e.g., whether the identifier is or is not approved for entry, the circumstances under which the identifier is/is not approved, etc.) can be determined, e.g., with respect to the identifier. As noted, in certain implementations the referenced information repository can include a database, list, etc. of approved, prohibited, etc. identifiers. It should be understood that, in certain implementations, various aspects of block 330 can be performed by server 120, services 130, 140, and/or devices 102, while in other implementations such aspects may be performed by one or more other elements/components, such as those described herein.

At block 340, a determination (e.g., at 320) that the identifier is present within the one or more images captured in relation to the device (e.g., a first gate, door, entrance, etc.) can be compared with a determination that the identifier is present within one or more images captured in relation to another device (e.g., a second gate, door, entrance, etc., such as may be deployed at another geographic location). In doing so, it can be determined, for example, whether the same identifier has been used to access multiple gates/locations (e.g., those in different geographic areas), such as within a defined chronological interval (e.g., within one hour of each other), such as in a manner described herein. It should be understood that, in certain implementations, various aspects of block 340 can be performed by server 120, services 130, 140, and/or devices 102, while in other implementations such aspects may be performed by one or more other elements/components, such as those described herein.

Moreover, in certain implementations a determination (e.g., at 320) that the identifier is present within the one or more images captured in relation to the device (e.g., a gate, door, entrance, etc.) can be compared with a determination that the identifier is present within one or more images previously captured in relation to the device (e.g., the same gate, door, entrance, etc.). In doing so, for example, an access history/log can be generated/utilized, e.g., by server 120 and/or services 130, 140. Such a history can reflect when a particular vehicle last accessed certain gates, doors, etc. Upon determining, for example, that a particular vehicle (which is included on an 'approved' list) has not accessed a particular gate (or any gate) in several years, when such a vehicle attempts to subsequently access the gate, a notification and/or alert can be generated/provided, and/or the default 'access' permission can be overridden, on account of the fact that the identifier (that is, the license plate) may be fraudulent (since it has not been seen by the system in several years).

At block 350, an instruction protocol can be identified. In certain implementations, such a protocol may be a protocol associated with the device (e.g., a protocol which reflects how to format instructions to a particular gate, door, etc.). It should be understood that, in certain implementations, various aspects of block 350 can be performed by server 120, services 130, 140, and/or devices 102, while in other implementations such aspects may be performed by one or more other elements/components, such as those described herein.

At block 360, an instruction can be generated. In certain implementations, such an instruction can be generated based on/corresponding to the permission status of the referenced identifier (e.g., that the identifier is 'approved' for entry). Moreover, in certain implementations, the instruction can be generated based on/corresponding to the instruction protocol that corresponds to the relevant device (gate, door, appliance, etc.). For example, such an instruction can include an 'open' instruction (e.g., to open the corresponding gate, door, etc.). It should be understood that, in certain implementations, various aspects of block 360 can be performed by server 120, services 130, 140, and/or devices 102, while in other implementations such aspects may be performed by one or more other elements/components, such as those described herein.

Moreover, in certain implementations instruction(s) can be generated based on a determination that an identifier is present within the one or more images captured in relation to the device (e.g., a first gate, door, entrance, etc.) and is also present within one or more images captured in relation to another device (e.g., a second gate, door, entrance, etc., such as may be deployed at another geographic location). Such an instruction can, for example, include an instruction to override the permission status. For example, upon determining that the same identifier has been used to access multiple gates/locations (e.g., those in different geographic areas), such as within a defined chronological interval (e.g., within one hour of each other), the permission(s) otherwise associated with such an identifier (e.g., an 'approved' permission) can be overridden, as described herein.

At block 370, the instruction (e.g., the instruction generated at 360) can be provided to the device (e.g., the gate, door, entrance, appliance etc.), e.g., via one or more routers, gateways, etc., such as are described herein. Additionally, further image capture and/or processing can be performed, e.g., to determine that instruction has been successfully performed (e.g., that the gate has successfully been opened), and/or that one or more subsequent events have taken place (e.g., that the vehicle has successfully passed through the gate). It should be understood that, in certain implementations, various aspects of block 360 can be performed by server 120, services 130, 140, and/or devices 102, while in other implementations such aspects may be performed by one or more other elements/components, such as those described herein.

Figure 4:
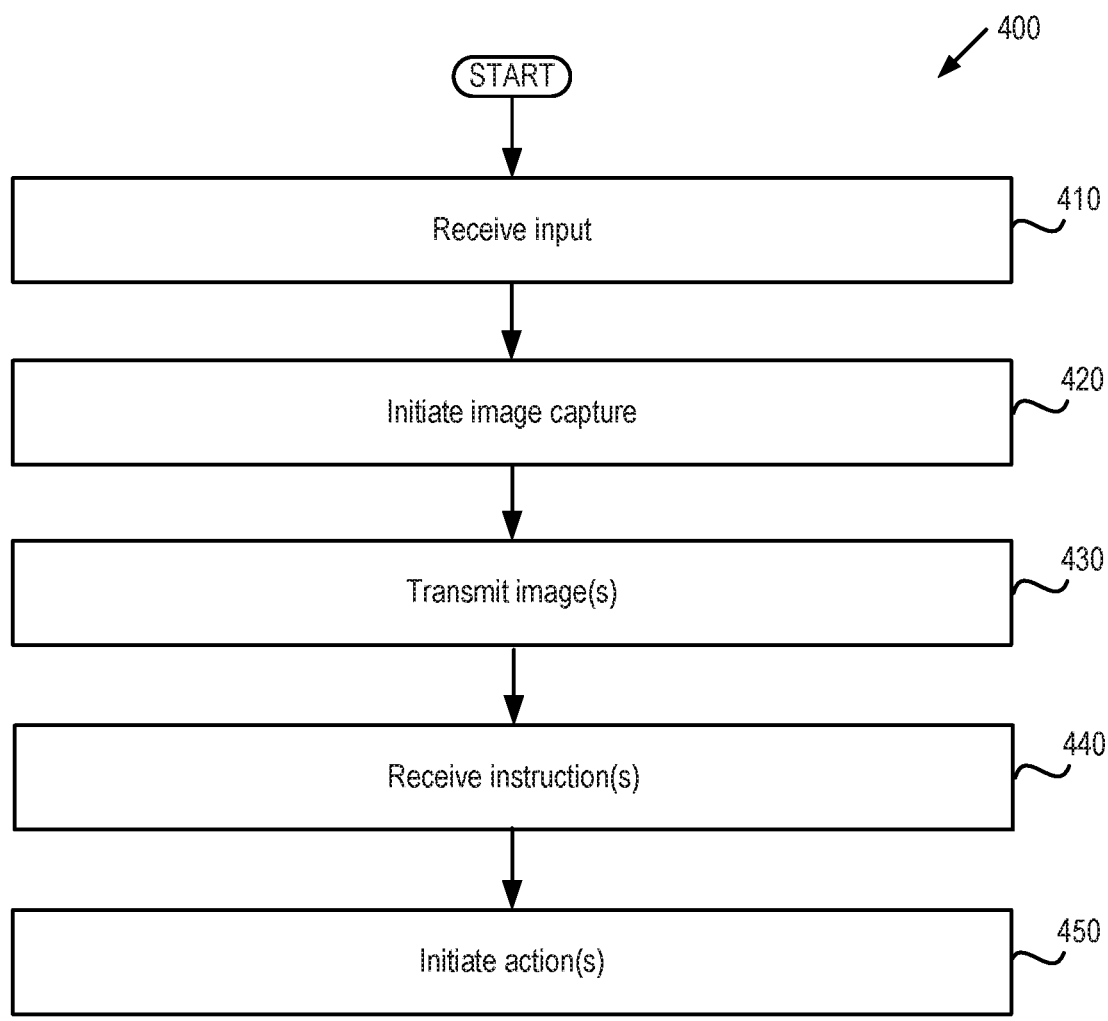
FIG. 4 depicts a flow diagram of aspects of a method for cloud-based device management in accordance with one implementation of the present disclosure.

FIG. 4 depicts a flow diagram of a method 400 for cloud-based ANPR management. The method is performed by processing logic that may comprise hardware (circuitry, dedicated logic, etc.), software (such as is run on a computer system or a dedicated machine or special purpose machine), or a combination of both. In one implementation, the method is performed by one or more elements depicted and/or described in relation to FIGS. 1 and 2, while in some other implementations, one or more blocks of FIG. 4 may be performed by another machine or machines.

At block 410, an input can be received. In certain implementations, such an input may to a sensor trigger, such as is described herein. It should be understood that, in certain implementations, various aspects of block 410 can be performed by server 120, services 130, 140, and/or devices 102, while in other implementations such aspects may be performed by one or more other elements/components, such as those described herein.

At block 420, capture of one or more images (e.g., by an imaging device) can be initiated. In certain implementations, such capture can be initiated in response to the first input such as in a manner described herein. It should be understood that, in certain implementations, various aspects of block 420 can be performed by server 120, services 130, 140, and/or devices 102, while in other implementations such aspects may be performed by one or more other elements/components, such as those described herein.

At block 430, the one or more images (such as those captured at 420) can be transmitted, e.g., to an identification service, such as in a manner described herein. It should be understood that, in certain implementations, various aspects of block 430 can be performed by server 120, services 130, 140, and/or devices 102, while in other implementations such aspects may be performed by one or more other elements/components, such as those described herein.

At block 440, one or more instructions can be received, e.g., from the identification service, such as in a manner described herein. It should be understood that, in certain implementations, various aspects of block 440 can be performed by server 120, services 130, 140, and/or devices 102, while in other implementations such aspects may be performed by one or more other elements/components, such as those described herein.

At block 450, one or more actions can be initiated with respect to a device, e.g., based on the one or more instructions, such as in a manner described herein. It should be understood that, in certain implementations, various aspects of block 450 can be performed by server 120, services 130, 140, and/or devices 102, while in other implementations such aspects may be performed by one or more other elements/components, such as those described herein.

It should also be noted that while the technologies described herein are illustrated primarily with respect to cloud-based ANPR management, gates, doors, etc., the described technologies can also be implemented in any number of additional or alternative settings or contexts (e.g., in order to control various other devices, based on various other criteria, triggers, etc.) and towards any number of additional objectives.

FIG. 5 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a computing device integrated within and/or in communication with a vehicle, a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 which may embody any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein which may also include a computer program stored and/or executed by the apparatus. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to practically any type of data. The scope of the disclosure should, therefore, be determined with reference to the appended claims, along with the full scope of equivalents to which such claims are entitled.

What is claimed is:

1. A method comprising:
   receiving one or more images captured in relation to a device;
   processing the one or more images to determine a presence of one or more identifiers within the one or more images;
   based on a determination that an identifier is present within the one or more images, processing the identifier in relation to an information repository to determine a permission status with respect to the identifier;
   identifying an instruction protocol, the instruction protocol comprising formatting associated with instructions directed to the device;
   generating, by a processing device and based on the permission status determined with respect to the identifier, an instruction corresponding to the permission status and the instruction protocol; and
   providing the instruction to the device.

2. The method of claim 1, wherein the device comprises at least one of a gate or a door.

3. The method of claim 1, wherein the one or more images are captured in response to receipt of a sensor trigger.

4. The method of claim 1, wherein processing the one or more images comprises processing the one or more images using optical character recognition (OCR) to determine a presence of one or more identifiers within the one or more images.

5. The method of claim 1, wherein the information repository comprises one or more approved identifiers.

6. The method of claim 1, wherein the information repository comprises one or more prohibited identifiers.

7. The method of claim 1, further comprising comparing the determination that the identifier is present within the one or more images captured in relation to the device with a determination that the identifier is present within one or more images captured in relation to another device.

8. The method of claim 7, wherein generating an instruction comprises generating the instruction based on a determination that the identifier is present within the one or more images captured in relation to the device and is also present within one or more images captured in relation to another device.

9. The method of claim 8, wherein the instruction comprises an instruction to override the permission status.

10. The method of claim 1, further comprising comparing the determination that the identifier is present within the one or more images captured in relation to the device with a determination that the identifier is present within one or more images previously captured in relation to the device.

11. The method of claim 10, wherein the instruction comprises an instruction to override the permission status.

12. The method of claim 1, further comprising determining one or more processing parameters.

13. The method of claim 12, wherein processing the one or more images comprises processing the one or more images based on the one or more processing parameters to determine a presence of one or more identifiers within the one or more images.

14. The method of claim 12, wherein the one or more processing parameters are determined based on one or more images previously captured in relation to the device.

15. The method of claim 1, wherein processing the one or more images further comprises allocating one or more computing resources to the processing of the one or more images.

16. The method of claim 1, wherein processing the one or more images further comprises distributing the processing of the one or more images across a plurality of computing resources from a plurality of machines.

17. The method of claim 1, wherein processing the one or more images further comprises: in response to receipt of one or more additional processing requests, redistributing the processing of the one or more images from a first computing resource from a first machine to a second computing resource from a second machine.

18. The method of claim 1, wherein processing the one or more images further comprises tracking one or more events associated with the one or more images.

19. A system comprising:
a memory; and
a processing device, operatively coupled to the memory, to:
determine, based on one or more images previously captured in relation to a device, one or more processing parameters;
receive one or more images captured in relation to the device;
based on the one or more processing parameters, process the one or more images across a plurality of computing resources allocated from a plurality of machines in response to receipt of one or more additional processing requests, to determine a presence of one or more identifiers within the one or more images;
based on a determination that an identifier is present within the one or more images, process the identifier in relation to an information repository to determine a permission status with respect to the identifier;
identify an instruction protocol associated with the device, the instruction protocol comprising formatting associated with instructions directed to the device;
generate, based on the permission status determined with respect to the identifier, an instruction corresponding to the permission status and the instruction protocol; and
provide the instruction to the device.

20. A non-transitory computer readable medium having instructions stored thereon that, when executed by a processing device, cause the processing device to:
receive a first input, the first input corresponding to a sensor trigger;
in response to the first input, initiate, by the processing device, capture of one or more images;
transmit the one or more images to an identification service;
receive, from the identification service, one or more instructions generated with respect to determination, as computed by the identification service, that an identifier is present within the one or more images; and
initiate, based on the one or more instructions, one or more actions with respect to a device.

* * * * *